US009958547B2

United States Patent
Fu et al.

(10) Patent No.: US 9,958,547 B2
(45) Date of Patent: May 1, 2018

(54) THREE-DIMENSIONAL IMAGING RADAR SYSTEM AND METHOD BASED ON A PLURALITY OF TIMES OF INTEGRAL

(71) Applicant: Hangzhou Guangpo Intelligent Technology Co., Ltd., Hangzhou, Zhejiang (CN)

(72) Inventors: Jian Fu, Zhejiang (CN); Xiuda Zhang, Zhejiang (CN); Jun Lv, Zhejiang (CN); Yingjie Gu, Zhejiang (CN)

(73) Assignee: HANGZHOU GUANGPO INTELLIGENT TECHNOLOGY CO., LTD., Hangzhou, Zhejiang (CN)

( * ) Notice: Subject to any disclaimer, the term of this patent is extended or adjusted under 35 U.S.C. 154(b) by 386 days.

(21) Appl. No.: 15/039,453

(22) PCT Filed: Jul. 30, 2013

(86) PCT No.: PCT/CN2013/080416
§ 371 (c)(1),
(2) Date: May 26, 2016

(87) PCT Pub. No.: WO2014/101408
PCT Pub. Date: Jul. 3, 2014

(65) Prior Publication Data
US 2016/0313446 A1    Oct. 27, 2016

(30) Foreign Application Priority Data

Dec. 25, 2012    (CN) .......................... 2012 1 0571277

(51) Int. Cl.
*G01C 3/08*    (2006.01)
*G01S 17/89*    (2006.01)
(Continued)

(52) U.S. Cl.
CPC ............. *G01S 17/89* (2013.01); *G01S 7/4861* (2013.01); *G01S 7/4865* (2013.01); *G01S 17/107* (2013.01)

(58) Field of Classification Search
CPC ....... G01S 17/89; G01S 7/4861; G01S 7/4865; G01S 17/107
See application file for complete search history.

(56) References Cited

U.S. PATENT DOCUMENTS

| | | | |
|---|---|---|---|
| 2008/0154495 A1* | 6/2008 | Breed | G01C 21/12 701/472 |
| 2009/0030605 A1* | 1/2009 | Breed | B60N 2/2863 701/532 |
| 2009/0140887 A1* | 6/2009 | Breed | G01C 21/165 340/990 |

FOREIGN PATENT DOCUMENTS

| | | |
|---|---|---|
| CN | 102622745 A | 8/2012 |
| CN | 102798868 A | 11/2012 |
| CN | 103064087 A | 4/2013 |

OTHER PUBLICATIONS

1st Office Action of counterpart Chinese Patent Application No. 201210571277.0 dated Dec. 24, 2013.

(Continued)

*Primary Examiner* — Samantha K Abraham
(74) *Attorney, Agent, or Firm* — U.S. Fairsky LLP; Yue Xu

(57) ABSTRACT

This invention discloses a three-dimensional imaging radar system and method based on a plurality of times of integral. The system includes an LED light source, an optical band-pass filter, an image sensor, an electronic shutter, a data processor, and a display terminal. The LED light source generates a series of light pulse trains, and when the light pulse trains illuminate an object, the object reflects the light in succession. The reflected light is sensed by the image (Continued)

sensor through the optical band-pass filter, to form an image on the image sensor. The image sensor performs exposure imaging three times in succession for the reflected light of the same pulse under the action of the electronic shutter. The data processor analyzes the three images to obtain contour information and distance information about the object. Finally, the display terminal displays results.

2 Claims, 2 Drawing Sheets

(51) Int. Cl.
     *G01S 17/10*     (2006.01)
     *G01S 7/486*     (2006.01)

(56) References Cited

OTHER PUBLICATIONS

Laurenzis, Martin, Long-range three-dimensional active imaging with superresolution depth mapping, Optics Letters, Nov. 1, 2007, pp. 3146-3148, vol. 32, No. 21.
International Search Report of PCT Patent Application No. PCT/CN2013/080416 dated Nov. 7, 2013.

* cited by examiner

THREE-DIMENSIONAL IMAGING RADAR SYSTEM AND METHOD BASED ON A PLURALITY OF TIMES OF INTEGRAL

BACKGROUND OF THE INVENTION

Field of the Invention

The invention relates to an imaging radar system and, more particularly, to a three-dimensional imaging radar system and method based on flight spectrum.

Description of the Related Art

Three-dimensional imaging radar technique can be widely applied to different fields, such as an anti-collision system of vehicles, a photographing measurement system on freeway, a range-measuring telescope, and machine vision. A three-dimensional imaging radar is an imaging system capable of measuring ranges, and the system includes an emitting part, a receiving part, and an information processing part. At present, the range-measuring principle of the radar includes fight time measurement, phase difference measurement, and triangulation.

The first measurement is the fight time measurement. In this measurement, a pulse light source is used, and a distance to a target object is calculated by measuring the time difference between the time of emitting the light pulse and receiving the reflected light pulse. This measurement can reach the better accuracy, generally reaching the accuracy in a centimeter level in a scope of several kilometers. However, to realize the three-dimensional imaging with a high resolution, points need to be scanned one by one, which is the most commonly used laser imaging radar at present, with a very low imaging speed and a very bad imaging resolution. In another way, a planar array detector with each unit capable of detecting pulses and counting time may be used. For example, an intensified CCD (ICCD) with high-speed modulation may be disposed before the imaging elements, which is applied to the three-dimensional radar without scanning laser. The measurement accuracy of this way is limited to the shape of the light pulse, the imaging resolution is limited to the image intensifier, and the manufacturing cost is high, which may be only used for military and national defense.

Another measurement is the phase difference measurement. In this measurement, a modulation light source is used, and the distance to the target object is acquired according to the phase difference between the reflected light and reference oscillation. Since the phase is limited to $2\pi$, the measuring distance of this measurement is limited to several meters, and the measuring accuracy is not high. At present, there is the radar system via the intensified CCD (ICCD) to realize the planar array phase measurement.

The third measurement is the triangulation. In this measurement, a structure light source is used, and the distance between the object and the light source is calculated according to the light point on the target object and the imaging triangular relation. Although the measuring accuracy of this measurement is high, the applicable measuring distance is shorter. This measurement is usually applied to precious mold manufacture, integrated circuit detection, and SMT circuit board detection. Further, the three-dimensional imaging may be realized by projecting colorful structure light in the two-dimensional space via the light encoded by different colors.

In the above radar range-measuring methods, only the distance information of the single point is obtained. If the target object is to be three-dimensionally imaged, points need to be collected one by one, or the planar array detectors are necessary to collect data in parallel. The present laser radar sensor has certain deficiencies. For example, although the element requirement of the scanned laser radar is lower and the work distance is further, the requirement for the scanning mechanism is higher, the frame rate is lower, and the real-time performance is worse; although the real-time performance of the planar array laser radar is great, the great planar array element is needed for high-resolution imaging, and the cost and research difficulty of the element is high. These laser radars need the light source in the nanosecond level or detectors with quick response.

In recent years, Optics Letters reports that French scientists realize the three-dimensional imaging via the microsecond laser pulse and the high-speed CCD camera based on the intensity integral (OPTICS LETTERS, Vol.32, 3146-3148, 2007). The cost of this measurement is lower than other planar array technique. However, since expensive elements such as lasers are used, the total cost is still higher, and the detecting distance and accuracy is greatly limited.

BRIEF SUMMARY OF THE INVENTION

The invention provides a three-dimension imaging radar system and method based on a plurality of times of integral, to improve the prior art. In the invention, the inexpensive LED/laser light source and a common CCD or CMOS planar array detector are used to realize the three-dimensional radar imaging.

The objective of the invention is realized according to the followings. A three-dimensional imaging radar system based on a plurality of times of integral includes an LED light source, an optical band-pass filter, an image sensor, an electronic shutter, a data processor, and a display terminal. The optical band-pass filter and the electronic shutter are fixed to the image sensor, the LED light source and the image sensor are connected with the data processor, and the data processor is connected with the display terminal. The LED light source generates a series of light pulse trains, and when the light pulse trains illuminate an object, the object reflects the light in succession. The reflected light is sensed by the image sensor through the optical band-pass filter, to form an image on the image sensor. The image sensor performs exposure imaging three times in succession for the reflected light of the same pulse under the action of the electronic shutter. The data processor analyzes the three images to obtain contour information and distance information about the object. Finally, the display terminal displays results. The LED light source includes one or more light pulse generators capable of generating microsecond light pulses and nanosecond light pulses, and the light pulse generator is an LED or laser.

A three-dimensional imaging method based on a plurality of times of integral using the system includes the followings:

(1) the LED light source generates a light pulse, within exposure time controlled by the electronic shutter, the image sensor continuously collects three light waves reflected by the object at the same place, to obtain three successive frame images, the collecting time interval is $\tau$, the pixel of the anterior two frame images is lower, and the pixel of the posterior frame image is higher;

(2) the third frame image is fitted to an image having the same pixel with the anterior two frame images via a pixel combining mode, to obtain a high-pixel image and a low-pixel image of the third frame image, and the high-pixel image includes more contour information of the object due to the high pixel;

(3) the data processor processes the anterior two frame images and the low-pixel image of the third frame image, to obtain a distance information point of the object;

the light intensity generated from the two frame images collected from the light with the wavelength λ changes with the distance, and the changes satisfy the followings:

$$I(S) = \int_\tau^T x(t-2S/C)g(t)dt;$$

$$I(S') = \int_\tau^{T+\tau} x(t-2S'/C)g(t)dt$$

S is a distance of the anterior frame, S' is a distance of the posterior frame, C is a light speed, t is time, x(t−2S/C) is a light pulse waveform of the anterior frame of the wavelength λ, x is weight, x(t−2S'/C) is a light pulse waveform of the posterior frame of the wavelength λ, g(t) is a waveform of the electronic shutter, T is integration time;

according to the above two formulas, the light intensity integration time of the reflected light of the object with the same distance on the image sensor is different, the light intensity with the greater integration time has the greater integral, the light intensity with the shorter integration time has the smaller integral, the image sensor performs light intensity integral for the collected light waves during the three times of exposure, to obtain three integral curve graphs for the same pixel point, since the light wave collected by the CCD is the convolution of the light intensity in the time domain, each integral curve graph has one top point, the three points determines a conic, further to determine a top point of the conic, the horizontal coordinate of the top point represents the round trip time of the signal light, that is, the distance information point of the object;

(4) the data processor obtains the detailed distance information of the object by combining the distance information point of the object acquired in the step (3) and the contour information of the third frame image, and the display terminal 6 finally displays the information.

The invention has the following beneficial effects. The working procedure of the light sensing elements of the image sensor is a light intensity integral procedure, the integral image in different time domains can be obtained as the light is sensed by the image sensor in different time, the distance and depth information of the target can be obtained by comparing the two integral images, and the position of the reflected object in the scope can be obtained by the continuous three times of exposure, thus to reduce the difficulty of data processing and to obtain the three-dimensional image with the greater anti-interference and higher accuracy. As the prior three-dimensional laser radar acquires the nanosecond light source and detector, in this invention, the three-dimensional imaging radar may be realized by the common LED light source and common CCD or CMOS planar array, thereby greatly reducing the system cost, and realizing the high-speed and high-resolution three-dimensional imaging, further to develop new application of the three-dimensional imaging radar in the vehicle anti-collision field, such as automobiles or helicopters, and the three-dimensional topography mapping field.

Figure 1:
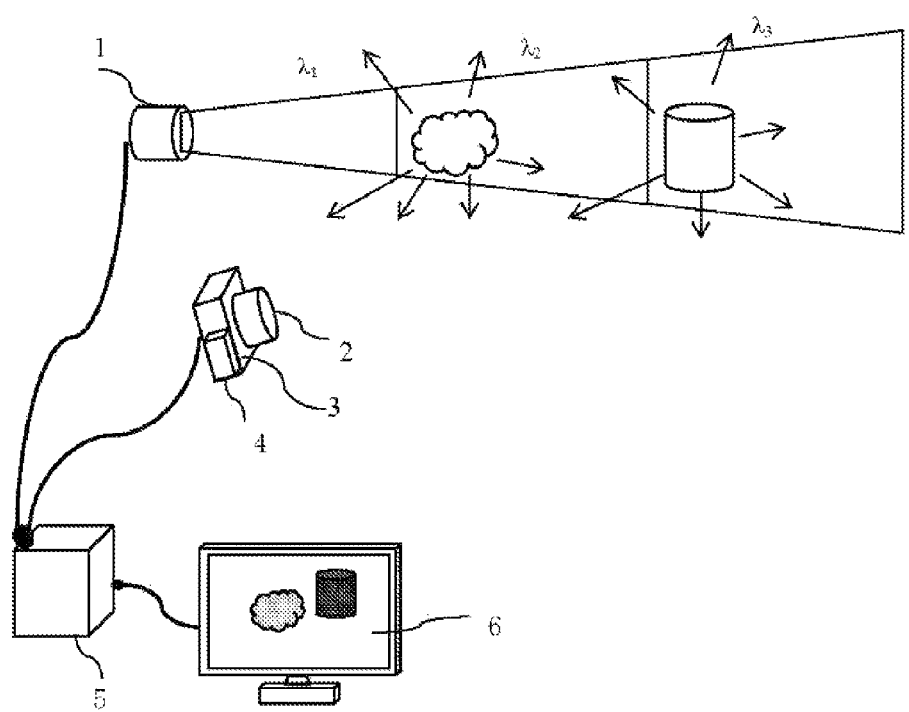
FIG. 1 is a schematic diagram of a three-dimensional imaging radar system based on a plurality of times of integral in the invention.

The figures show an LED light source 1, an optical band-pass filter 2, an image sensor 3, an electronic shutter 4, a data processor 5, a display terminal 6, and a spectroscope 7.

DETAILED DESCRIPTION OF THE INVENTION

The invention is described according to the figures, and the objective and effect of the invention may be better understood.

In FIG. 1, the three-dimensional imaging radar system based on a plurality of times of integral in the invention, includes an LED light source 1, an optical band-pass filter 2, an image sensor 3, an electronic shutter 4, a data processor 5, and a display terminal 6; the optical band-pass filter 2 and the electronic shutter 4 are fixed to the image sensor 3, the LED light source 1 and the image sensor 3 are connected with the data processor 5, the data processor 5 is connected with the display terminal 6; the LED light source 1 generates a series of light pulse trains, when these light pulse trains illuminate an object, the object reflects the light in succession; the reflected light is sensed by the image sensor 3 through the optical band-pass filter 2, to form an image on the image sensor 3; the image sensor performs exposure imaging three times in succession for the reflected light of the same pulse under the action of the electronic shutter, the data processor 5 analyzes the three images to obtain contour information and distance information of the object, and the display terminal 6 finally displays results.

The LED light source 1 includes one or more light pulse generators capable of generating microsecond pulses and nanosecond pulses, and the light pulse generator is an LED or laser.

The optical band-pass filter 2 is an optical element disposed on the image sensor 3 and only allowing the light in a certain set wavelength scope to pass, such as a RGB optical filter disposed in front of a colorized CMOS or CCD.

The image sensor 3 is an image sensing CMOS or CCD element with the exposure time controlled by the electronic shutter 4 and the frame frequency capable of reaching to more than 60 frames.

The electronic shutter 4 is disposed on the image sensor 3 and is an electronic device or element capable of controlling the global exposure time under 20 microseconds.

The data processor 5 may be realized by a single-chip, an embedded system, or a PC, and the working procedure of the data processor 5 is that:

(1) the data processor 5 emits an electrical signal for controlling the LED light source 1 to generate the light pulse;

(2) the data processor 5 emits a synchronous pulse to control the electronic shutter 4 after accurately controlling the delayed time, thus to control the exposure time and to control the exposure delayed interval of the image sensor;

(3) the image sensor 3 transmits the collected image data to the data processor 5;

(4) the data processor 5 processes the obtained image signals and transmits the images to the display terminal 6;

(5) the next light pulse and collection of the next frame image is prepared.

A three-dimensional imaging method based on a plurality of times of integral in the invention includes the following steps.

1. The LED light source 1 generates a light pulse, within exposure time controlled by the electronic shutter 4, the image sensor 3 continuously collects three light waves reflected by the object at the same place to obtain successive three frame images, the collecting time interval is τ, the pixel of the anterior two frame images is lower, and the pixel of the posterior frame image is higher.

2. The third frame image is fitted to an image having the same pixel with the anterior two frame images via a pixel combining mode, to obtain a high-pixel image and a low-pixel image of the third frame image, and the high-pixel image includes more contour information of the object due to the high pixel.

3. The data processor 5 processes the anterior two frame images and the low-pixel image of the third frame image, to obtain a distance information point of the object.

The light intensity generated from the two frame images collected from the light with the wavelength λ changes with the distance, and the changes satisfy the following:

$$I(S) = \int_\tau^T x(t-2S/C)g(t)dt;$$

$$I(S') = \int_\tau^{T+\tau} x(t-2S'/C)g(t)dt$$

S is a distance of the anterior frame, S' is a distance of the posterior frame, C is a light speed, t is time, $x(t-2S/C)$ is a light pulse waveform of the anterior frame of the wavelength λ, x is weight, $x(t-2S'/C)$ is a light pulse waveform of the posterior frame of the wavelength λ, $g(t)$ is a waveform of the electronic shutter, T is integration time.

According to the above two formulas, the light intensity integration time of the reflected light of the object with the same distance on the image sensor 3 is different, the light intensity with the greater integration time has the greater integral, and the light intensity with the shorter integration time has the smaller integral. The image sensor 3 performs light intensity integral for the collected light waves during the three times of exposure, to obtain three integral curve graphs for the same pixel point. Since the light wave collected by the CCD is the convolution of the light intensity in the time domain, each integral curve graph has one top point, the three points determines a conic, further to determine a top point of the conic, and the horizontal coordinate of the top point represents the round trip time of the signal light, that is, the distance information point of the object.

4. The data processor 5 obtains the detailed distance information of the object by combining the distance information point of the object acquired in the step 3 and the contour information of the third frame image, and the display terminal 6 finally displays the information.

Figure 2:
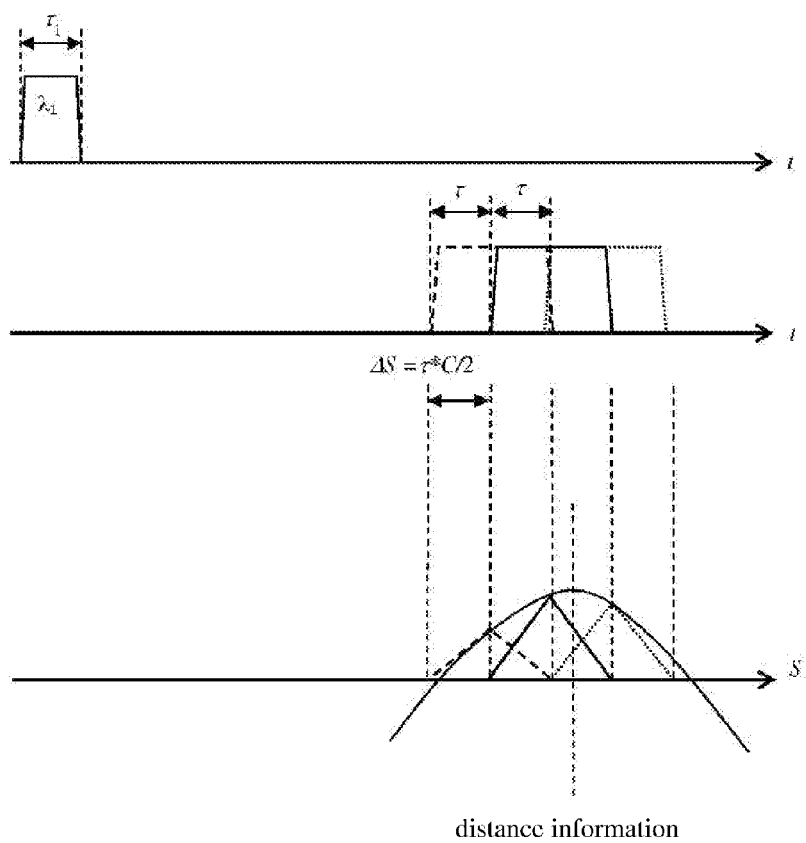
FIG. 2 is a schematic diagram showing the single imaging distance detection via convolution imaging signals in the time domain of a delayed double planar array CCD or CMOS.

FIG. 2 is a schematic diagram showing the single imaging distance detection via convolution imaging signals in the time domain of a delayed double planar array CCD or CMOS. In FIG. 2, the LED light source 1 generates the light pulse with the wavelength $λ_1$, and the pulse width of the pulse is $τ_1$. The delayed time of the electronic shutter 4 is $t_d$, the gate width is $τ_3$, the exposure interval of the image sensor 3 is τ, the target light intensity obtained by the image sensor 3 is the integral of the overlapped part of the pulse echo and the gate width of the electronic shutter, and the relation between the intensity and the distance is shown in FIG. 2. As the proper wavelength and the parameters $τ_1$, $τ_2$, $τ_3$, $t_d$ are selected, via the time control of the electronic shutter, the image sensor 3 obtains the continuous three convolution waveform graphs. The distance information of the pixel point of the object is determined according to the positions and sizes of the top points of the three convolution waveform graphs.

What is claimed is:

1. A three-dimensional imaging radar system based on a plurality of times of integral, comprising: an LED light source (1), an optical band-pass filter (2), an image sensor (3), an electronic shutter (4), a data processor (5), and a display terminal (6), wherein the optical band-pass filter (2) and the electronic shutter (4) are fixed to the image sensor (3), the LED light source (1) and the image sensor (3) are connected with the data processor (5), the data processor (5) is connected with the display terminal (6), the LED light source (1) generates a series of light pulse trains, when these light pulse trains illuminate an object, the object reflects the light in succession, the reflected light is sensed by the image sensor (3) through the optical band-pass filter (2), to form an image on the image sensor (3), the image sensor performs exposure imaging three times in succession for the reflected light of the same pulse under the action of the electronic shutter, the data processor (5) analyzes the three images to obtain contour information and distance information of the object, the display terminal (6) finally displays results, the LED light source (1) includes one or more light pulse generators capable of generating microsecond pulses and nanosecond pulses, and the light pulse generator is an LED or laser.

2. A three-dimensional imaging method based on a plurality of times of integral using the system according to claim 1, comprising:

(1) the LED light source (1) generating a light pulse, within exposure time controlled by the electronic shutter (4), the image sensor (3) continuously collecting three light waves reflected by the object at the same place to obtain successive three frame images, the collecting time interval being τ, the pixel of the anterior two frame images being lower, the pixel of the posterior frame image being higher;

(2) fitting the third frame image to an image having the same pixel with the anterior two frame images via a pixel combining mode, to obtain a high-pixel image and a low-pixel image of the third frame image, the high-pixel image including more contour information of the object due to the high pixel;

(3) the data processor (5) processing the anterior two frame images and the low-pixel image of the third frame image, to obtain a distance information point of the object;

wherein the light intensity generated from the two frame images collected from the light with the wavelength λ changes with the distance, and the changes satisfy the following:

$$I(S) = \int_\tau^T x(t-2S/C)g(t)dt;$$

$$I(S') = \int_\tau^{T+\tau} x(t-2S'/C)g(t)dt$$

S is a distance of the anterior frame, S' is a distance of the posterior frame, C is a light speed, t is time, $x(t-2S/C)$ is a light pulse waveform of the anterior frame of the wavelength λ, x is weight, $x(t-2S'/C)$ is a light pulse waveform of the posterior frame of the wavelength λ, $g(t)$ is a waveform of the electronic shutter, T is integration time;

according to the above two formulas, the light intensity integration time of the reflected light of the object with the same distance on the image sensor (3) is different, the light intensity with the greater integration time has the greater integral, the light intensity with the shorter integration time has the smaller integral, the image sensor (3) performs the light intensity integral for the collected light waves during the three times of exposure, to obtain three integral curve graphs for the same pixel point, since the light wave collected by CCD is the convolution of the light intensity in the time domain, each integral curve graph has one top point, the three points determines a conic, further to determine a top point of the conic, the horizontal coordinate of the top point represents the round trip time of the signal light, that is, the distance information point of the object;

(4) the data processor (5) obtaining the detailed distance information of the object by combining the distance information point of the object acquired in the step (3) and the contour information of the third frame image, and the display terminal (6) finally displaying the information.

\* \* \* \* \*